United States Patent
Hanes, Jr. et al.

(10) Patent No.: US 7,311,146 B1
(45) Date of Patent: Dec. 25, 2007

(54) SUBTERRANEAN TREATMENT FLUIDS, FRICTION REDUCING COPOLYMERS, AND ASSOCIATED METHODS

(75) Inventors: Robert E. Hanes, Jr., Lee's Summit, MO (US); David E. McMechan, Duncan, OK (US); Karen L. King, Duncan, OK (US); Jiten Chatterji, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/504,939

(22) Filed: Aug. 16, 2006

(51) Int. Cl.
*E21B 43/26* (2006.01)

(52) U.S. Cl. .................. 166/279; 166/300; 166/308.2

(58) Field of Classification Search ............... None
See application file for complete search history.

(56) References Cited

U.S. PATENT DOCUMENTS

| | | | |
|---|---|---|---|
| 3,768,565 A * | 10/1973 | Persinski et al. | 166/308.2 |
| 5,027,843 A * | 7/1991 | Grabois et al. | 137/13 |
| 5,067,508 A * | 11/1991 | Lee et al. | 137/13 |
| 5,939,362 A * | 8/1999 | Johnson et al. | 252/390 |
| 6,784,141 B1 | 8/2004 | King et al. | 507/222 |
| 6,787,506 B2 * | 9/2004 | Blair et al. | 507/222 |
| 7,004,254 B1 * | 2/2006 | Chatterji et al. | 166/279 |

OTHER PUBLICATIONS

Shirota et al., "Ultrafast Dynamics in Aqueous Polyacrylamide Soultions," J. Am. Chem. Soc. 123, 12877-12855, 2001.
Smith et al., "Water Soluble Polymers. 78. Viscosity and NRET Fluorescence Studies of pH-Responsive Twin-Tailed Associative Terpolymers Based on Acrylic Acid and Methacrylamide," Macromolecules 34, 918-924, 2001.
Ghosh et al., "On the Salt-Induced Stabilization of Pair and Many-body Hydrophobic Interactions," J. Phys. Chem. B 109, 642-651, 2005.

* cited by examiner

*Primary Examiner*—Zakiya W. Bates
*Assistant Examiner*—Angela DiTrani
(74) *Attorney, Agent, or Firm*—Robert A. Kent; Baker Botts, L.L.P.

(57) ABSTRACT

Methods of treating a portion of a subterranean formation, comprising: providing an aqueous treatment fluid comprising water, and a friction reducing copolymer that comprises acrylamide and an acrylic acid ester; and introducing the aqueous treatment fluid into the portion of the subterranean formation. Methods of fracturing a subterranean formation comprising: providing an aqueous treatment fluid comprising water, and a friction reducing copolymer that comprises acrylamide and an acrylic acid ester; and introducing the aqueous treatment fluid into the subterranean formation at or above a pressure sufficient to create one or more fractures in the subterranean formation. Aqueous treatment fluids comprising: an aqueous fluid and a friction reducing copolymer that comprises acrylamide and an acrylic acid ester.

20 Claims, No Drawings

SUBTERRANEAN TREATMENT FLUIDS, FRICTION REDUCING COPOLYMERS, AND ASSOCIATED METHODS

CROSS-REFERENCE TO RELATED APPLICATIONS

The present invention is related to U.S. patent application Ser. No. 11/504,938, entitled "Subterranean Treatment Fluids, Friction Reducing Copolymers, and Associated Methods," filed on the same date herewith, the entire disclosure of which is incorporated herein by reference.

BACKGROUND

The present invention relates to subterranean treatments, and more particularly, to aqueous subterranean treatment fluids that comprise friction reducing copolymers and associated methods.

Aqueous treatment fluids may be used in a variety of subterranean treatments. Such treatments include, but are not limited to, stimulation operations and completion operations. As used herein, the term "treatment," or "treating," refers to any subterranean operation that uses a fluid in conjunction with a desired function and/or for a desired purpose. The term "treatment," or "treating," does not imply any particular action by the fluid.

An example of a subterranean treatment utilizing an aqueous treatment fluid is hydraulic fracturing. Hydraulic fracturing is a process commonly used to increase the flow of desirable fluids, such as oil and gas, from a portion of a subterranean formation. In hydraulic fracturing, a fracturing fluid is introduced into the subterranean formation at or above a pressure sufficient to create or enhance one or more fractures therein. Enhancing a fracture includes enlarging a pre-existing fracture in the formation. One type of hydraulic fracturing is commonly referred to as "high-rate water fracturing." Typically, high-rate water fracturing is utilized in subterranean formations with low permeability (e.g., no more than about 0.1 millidarcy). Unlike conventional fracturing fluids, fluids used in high-rate water fracturing generally do not contain a sufficient amount of polymer to form a gel. Gel formation is based on a number of factors including the particular polymer and concentration thereof, temperature, and a variety of other factors known to those of ordinary skill in the art. As a result, the fracturing fluids used in high-rate water fracturing operations generally have a lower viscosity than traditional fracturing fluids.

During the placement of aqueous treatment fluids into a well bore, a considerable amount of energy may be lost due to friction between the treatment fluid in turbulent flow and the formation and/or tubular goods (e.g., pipes, coiled tubing, etc.) disposed within the well bore. As a result of these energy losses, additional horsepower may be necessary to achieve the desired treatment. To reduce these energy losses, friction reducing polymers have heretofore been included in aqueous treatment fluids. The term "friction reducing polymer," as used herein, refers to a polymer that reduces frictional losses due to friction between an aqueous fluid in turbulent flow and tubular goods (e.g. pipes, coiled tubing, etc.) and/or the formation. These friction reducing polymers may be synthetic polymers, natural polymers, or viscoelastic surfactants and are thought to reduce the friction between the aqueous treatment fluid in turbulent flow and the tubular goods and/or the formation.

In some instances, friction reducing polymers are oil-external emulsions, wherein upon addition to the aqueous treatment fluid, the emulsion should invert releasing the friction reducing polymer into the fluid. One such friction reducing polymer is a copolymer of acrylic acid and acrylamide. However, it is believed that the ionic nature of certain friction reducing polymers (such as the aforementioned copolymer) may cause these polymers to interact with formation fines and/or salts, particularly polyvalent metal cations, and thereby form flocs. The term "floc" as used herein, refers to a coagulated mass of particles in a liquid. The resulting flocs may be undesirable because, among other things, the flocs may facilitate the formation of agglomerates that may clog pumps, filters, surface equipment and possibly plug fractures. Similarly, flocs may also reduce the fluid conductivity in the formation by adsorbing onto fracture faces within the formation or by possibly forming a stable emulsion in the formation that impacts subsequent production from the well bore.

SUMMARY

The present invention relates to subterranean treatments, and more particularly, to aqueous subterranean treatment fluids that comprise friction reducing copolymers and associated methods.

One embodiment of the present invention is a method of treating a portion of a subterranean formation, comprising: providing an aqueous treatment fluid comprising water, and a friction reducing copolymer that comprises acrylamide and an acrylic acid ester; and introducing the aqueous treatment fluid into the portion of the subterranean formation.

Another embodiment of the present invention is a method of treating a portion of a subterranean formation, comprising: providing an aqueous treatment fluid comprising water, and a friction reducing copolymer that comprises acrylamide in an amount in the range of from about 60% to about 95% by weight and an acrylic acid ester in an amount in the range of from about 5% to about 40% by weight; and introducing the aqueous treatment fluid into the portion of the subterranean formation.

Yet another embodiment of the present invention is a method of fracturing a subterranean formation comprising: providing an aqueous treatment fluid comprising water, and a friction reducing copolymer that comprises acrylamide and an acrylic acid ester; and introducing the aqueous treatment fluid into the subterranean formation at or above a pressure sufficient to create one or more fractures in the subterranean formation.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to subterranean treatments, and more particularly, to aqueous subterranean treatment fluids that comprise friction reducing copolymers and associated methods.

I. Aqueous Treatment Fluids of the Present Invention

The aqueous treatment fluids of the present invention generally comprise an aqueous fluid, and a friction reducing copolymer of the present invention that comprises acrylamide and an acrylic acid ester. The term "friction reducing copolymer," as used herein, refers to a copolymer that reduces frictional losses due to friction between an aqueous treatment fluid in turbulent flow and tubular goods (e.g. pipes, coiled tubing, etc.) and/or the formation. The term "copolymer," as used herein, is not limited to polymers comprising two types of monomeric units, but includes any combination of monomeric units, e.g., terpolymers, tetrapolymers, and the like.

Generally, a friction reducing copolymer of the present invention may be included in any aqueous treatment fluid used in subterranean treatments to reduce friction. Such subterranean treatments include, but are not limited to, stimulation treatments (e.g., fracturing treatments, acidizing treatments, fracture acidizing treatments) and completion operations. Those of ordinary skill in the art, with the benefit of this disclosure, will be able to recognize a suitable subterranean treatment where friction reduction may be desired.

Suitable aqueous fluids that may be used in the present invention include fresh water, salt water, brine, seawater, or combinations thereof. Generally, the aqueous fluid used may be from any source, provided it does not contain an excess of compounds that may adversely affect the other components used in accordance with this invention or the subterranean formation. While the friction reducers of the present invention may be suitable for use in a variety of aqueous treatment fluids, they may be particularly useful in treatment fluids wherein a friction reducing polymers' reduced sensitivity to salt is desired.

The friction reducing copolymers of the present invention comprise acrylamide and an acrylic acid ester. Generally, the acrylic acid ester present in the friction reducing copolymers of the present invention may be any acrylic acid ester that maximizes friction reduction while minimizing flocculation and salt intolerance. In determining a suitable acrylic acid ester for use in the present invention, a variety of techniques may be used including, but not limited to, determining the radius of gyration for a particular friction reducing copolymer in the presence of interfering salts. Generally, including an acrylic acid ester that will give the copolymer a larger radius of gyration is desirable. It is believed that friction reducing polymers possess large radii of gyration, in addition to generally having a molecular weight greater than 7,500,000 atomic mass units ("amu"). While removing the anionic character of these polymers may help with preventing the formation of flocs, it is likely that charge repulsion helps increase the radius of gyration. The acrylic acid esters included in the friction reducing copolymers of the present invention are believed to increase radii of gyration through steric repulsion, relative to those polymers composed entirely of acrylamide. Suitable methods used to determine the radius of gyration are well known by those skilled in the art. Examples of acrylic acid esters suitable for use in the friction reducing copolymers of the present invention include, but are not limited to, those acrylic esters shown in Table 1 with a high radius of gyration, such as 2-hydroxyethyl acrylate and 2-(2-hydroxy-ethoxy)-ethyl acrylate. Those of ordinary skill in the art, with the benefit of this disclosure, will be able to select an appropriate acrylic acid ester to include in the friction reducing copolymers of the present invention based on a variety of factors, including the desired level of friction reduction and flocculation properties The amount of acrylamide and acrylic acid ester to include in the friction reducing copolymers of the present invention may be determined based on a number of factors, including the desired friction reduction, flocculation properties, etc. Generally, the acrylamide may be present in the friction reducing copolymers of the present invention in an amount in the range of from about 60% to about 95% by weight and an acrylic acid ester in an amount in the range of from about 5% to about 40% by weight. In other embodiments, the acrylamide may be present in the friction reducing copolymers of the present invention in an amount in the range of from about 70% to about 92.5% by weight and an acrylic acid ester in an amount in the range of from about 7.5% to about 30% by weight. In another embodiment, the acrylamide may be present in the friction reducing copolymers of the present invention in an amount of about 85% by weight and an acrylic acid ester may be present in an amount of about 15% by weight.

Among other things, the friction reducing copolymers of the present invention should reduce energy losses due to friction in the aqueous treatment fluids of the present invention. For example, the friction reducing copolymers of the present invention may reduce energy losses during introduction of the aqueous treatment fluid into a well bore due to friction between the aqueous treatment fluid in turbulent flow and the formation and/or tubular good(s) (e.g., a pipe, coiled tubing, etc.) disposed in the well bore. Further, due to the presence of an acrylic acid ester, the friction reducing copolymers of the present invention may have a reduced sensitivity to salts as compared to copolymers used previously for friction reduction, as well as a reduced ionic nature, thereby minimizing the flocculation properties thereof.

The friction reducing copolymers of the present invention should have a molecular weight sufficient to provide a desired level of friction reduction. Generally, friction reducing copolymers having higher molecular weights may be needed to provide a desirable level of friction reduction. For example, in some embodiments, the weight average molecular weight of the friction reducing copolymers may be in the range of from about 7,500,000 to about 20,000,000, as determined using intrinsic viscosities. Those of ordinary skill in the art will recognize that friction reducing copolymers having molecular weights outside the listed range may still provide some degree of friction reduction in an aqueous treatment fluid.

The friction reducing copolymers of the present invention should be included in the aqueous treatment fluids of the present invention in an amount sufficient to provide the desired reduction of friction. In some embodiments, a friction reducing copolymer of the present invention may be present in an amount in the range of from about 0.01% to about 4% by weight of the aqueous treatment fluid. In some embodiments, a friction reducing copolymer of the present invention may be present in an amount in the range of from about 0.025% to about 0.2% by weight of the aqueous treatment fluid.

The friction reducing copolymers suitable for use in the present invention may be made in accordance with any of a variety of polymerization methods. In one embodiment, a suitable friction reducing copolymer may be prepared using an emulsion polymerization technique. Those of ordinary skill in the art, with the benefit of this disclosure, will recognize an appropriate polymerization method to synthesize a suitable friction reducing copolymer. The present invention does not lie in the polymerization method used to synthesize the friction reducing copolymers of the present invention so long as it yields the desired friction reducing copolymer.

After polymerization, the friction reducing copolymers of the present invention may be provided in any suitable form, including in a solid form, in an oil-external copolymer emulsion, or as a component of an aqueous solution. Preparation of an oil-external copolymer emulsion will be described in more detail below.

Additional additives may be included in the aqueous treatment fluids of the present invention as deemed appropriate by one of ordinary skill in the art, with the benefit of this disclosure. Examples of such additives include, but are not limited to, corrosion inhibitors, proppant particulates, acids, fluid loss control additives, surfactants, breakers, iron-control inhibitors, scale inhibitors, and clay stabilizers. For example, an acid may be included in the aqueous treatment fluids, among other things, for a matrix or fracture acidizing treatment. In fracturing embodiments, proppant particulates may be included in the aqueous treatment fluids to prevent the fracture from closing when the hydraulic pressure is released.

II. Oil-External Copolymer Emulsions

In embodiments where a particular friction reducing copolymer of the present invention is an oil-external copolymer emulsion, the oil-external copolymer emulsion may comprise water, a water-immiscible liquid, an emulsifier, and a friction reducing copolymer of the present invention. Suitable oil-external copolymer emulsions further may comprise inhibitors, salts, and inverters.

The water present in the oil-external copolymer emulsions generally includes fresh water, salt water, brine, seawater, or combinations thereof. Generally, the water used may be from any source, provided it does not contain an excess of compounds that may adversely affect other components in the oil-external copolymer emulsion. In some embodiments, the water may be present in the oil-external copolymer emulsion in an amount in the range of from about 35% to about 50% by weight of the emulsion.

Suitable water-immiscible liquids may include, but are not limited to, water-immiscible solvents, such as paraffin hydrocarbons, napthene hydrocarbons, aromatic hydrocarbons, and mixtures thereof. The paraffin hydrocarbons may be saturated, linear, or branched paraffin hydrocarbons. Examples of suitable aromatic hydrocarbons include, but are not limited to, toluene and xylene. An example of a suitable water-immiscible solvent comprising paraffin hydrocarbons and napthene hydrocarbons is "LPA®-210", available from Sasol North America, Inc., Houston, Tex. The water-immiscible liquid may be present in the oil-external copolymer emulsion in an amount sufficient to form a stable emulsion. In some embodiments, the water-immiscible liquid may be present in the oil-external copolymer emulsions in an amount in the range of from about 20% to about 30% by weight.

Emulsifiers should be present in the oil-external copolymer emulsion, among other things, to facilitate the formation of an oil-external copolymer emulsion. Examples of suitable emulsifiers include, but are not limited to, ethoxylated nonionic surfactants, guerbet alcohol ethoxylate, and mixtures thereof. An example of a suitable emulsifier comprises a tall oil fatty acid diethanolamine, such as "AMADOL® 511", available from Akzo Nobel Surface Chemistry, Chicago, Ill. Another example of a suitable emulsifier comprises a polyoxyethylene (5) sorbitan monooleate, such as "TWEEN® 81," available from Uniqema, New Castle, Del. Another example of a suitable emulsifier comprises a sorbitan monooleate, such as "ALKAMULS® SMO," available from Rhone Poulenc, Inc., Paris, France. The emulsifier should be present in an amount sufficient to provide the desired stable oil-external emulsion. In some embodiments, the emulsifier may be present in an amount in the range of from about 0.5% to about 2.5% by weight of the emulsion.

The friction-reducing copolymers of the present invention that may be present in the oil-external copolymer emulsions are described above. The friction reducing copolymer should be present in the oil-external emulsion in an amount that does not undesirably impact the emulsion's stability. In some embodiments, the friction reducing copolymer may be present in an amount in the range of from about 30% to about 35% by weight of the emulsion.

In some embodiments, the oil-external copolymer emulsions further may comprise a salt. The salt may be present, among other things, to add stability to the emulsion and/or reduce the viscosity of the emulsion. Examples of suitable salts, include, but are not limited to, ammonium chloride, potassium chloride, sodium chloride, ammonium sulfate, and mixtures thereof. In some embodiments, the salt may be present in the oil-external emulsions in an amount in the range of from about 0.5% to about 2.5% by weight of the emulsion.

In some embodiments, the oil-external copolymer emulsions further may comprise an inhibitor. Among other things, the inhibitor may be included to prevent premature polymerization of the monomers prior to initiation of the emulsion polymerization reaction. As those of ordinary skill in the art will appreciate, with the benefit of this disclosure, the copolymer may have been synthesized using an emulsion polymerization technique wherein the inhibitor acted to prevent premature polymerization. Examples of inhibitors suitable for use in the present invention include, but are not limited to, quinones. An example of a suitable inhibitor comprises a 4-methoxyphenol (MEHQ). The inhibitor should be present in an amount sufficient to provide the desired prevention of premature polymerization. In some embodiments, the inhibitor may be present in an amount in the range of from about 0.001% to about 0.1% by weight of the emulsion.

In some embodiments, the oil-external copolymer emulsions further may comprise an inverter. Among other things, the inverter may facilitate the inverting of the emulsion upon addition to the aqueous treatment fluids of the present invention. As those of ordinary skill in the art will appreciate, with the benefit of this disclosure, upon addition to the aqueous treatment fluid, the emulsion should invert, releasing the copolymer into the aqueous treatment fluid. Examples of suitable inverters include, but are not limited to, ethoxylated alcohols, nonionic surfactant with an HLB of from 12 to 14, and mixtures thereof. An example of a suitable inverter comprises an ethoxylated C12-C16 alcohol, such as "SURFONIC® L24-7," available from Huntsman Performance Products, The Woodlands, Tex. The inverter should be present in an amount sufficient to provide the desired inversion of the emulsion upon contact with the aqueous fluid present in the aqueous treatment fluid. In some embodiments, the inhibitor may be present in an amount in the range of from about 1% to about 5% by weight of the emulsion.

In some embodiments, emulsion polymerization may be used to prepare a suitable oil-external copolymer emulsion that comprises a friction reducing copolymer of the present invention. Suitable emulsion polymerization techniques may have a variety of different initiation temperatures depending on, among other things, the amount and type of initiator used, the amount and type of monomers used, the amount and type of inhibitor used, and a number of other factors known to those of ordinary skill in the art. In one embodiment, a suitable emulsion polymerization technique may have an initiation temperature of about 25° C. Due to the exothermic nature of the polymerization reaction, the mixture may be maintained at a higher temperature than the initiation temperature during procession of the polymerization reaction, for example, in the range of from about 37° C. to about 45° C.

A variety of different mixtures may be used to prepare an oil-external copolymer emulsion comprising a friction reducing copolymer of the present invention. Suitable mixtures may include acrylamide, an acrylic acid ester, water, a water-immiscible liquid, an initiator, and an emulsifier. Optionally, the mixture further may comprise an inhibitor, an activator to initiate polymerization at a lower temperature, and an inverter. Those of ordinary skill in the art, with the benefit of this disclosure, will know the amount and type of components to include in the mixture based on a variety of factors, including the desired molecular weight and composition of the friction reducing copolymer and the desired initiation temperature.

III. Methods of the Present Invention

The aqueous treatment fluids of the present invention may be used in any subterranean treatment where the reduction of friction is desired. Such subterranean treatments include, but are not limited to, stimulation treatments (e.g., fracturing treatments, acidizing treatments, fracture acidizing treatments), and completion operations. Those of ordinary skill in the art, with the benefit of this disclosure, will be able to recognize a suitable subterranean treatment where friction reduction may be desired.

In some embodiments, the present invention provides a method of treating a portion of a subterranean formation comprising: providing an aqueous treatment fluid of the present invention comprising an aqueous fluid and a friction reducing copolymer of the present invention that comprises acrylamide in an amount in the range of from about 60% to about 90% by weight and an acrylic acid ester in an amount in the range of from about 10% about 40% by weight; and introducing the aqueous treatment fluid into the portion of the subterranean formation. In some embodiments, the aqueous treatment fluid may be introduced into the portion of the subterranean formation at a rate and pressure sufficient to create or enhance one or more fractures in the portion of the subterranean formation. In some embodiments, the aqueous treatment fluid may be introduced into the subterranean formation at a rate in the range of from about 30 barrels per minutes ("bpm") to about 250 bpm. In some embodiments, the rate may be in the range of from about 50 bpm to about 175 bpm. The portion of the subterranean formation that the aqueous treatment fluid is introduced into will vary dependent upon the particular subterranean treatment. For example, the portion of the subterranean formation may be a section of a well bore, for example, in a well bore cleanup operation. In the stimulation embodiments, the portion may be the portion of the subterranean formation to be stimulated.

The methods of the present invention further may comprise preparing the aqueous treatment fluid. Preparing the aqueous treatment fluid may comprise providing the friction reducing copolymer and combining the friction reducing copolymer with the aqueous fluid to from the aqueous treatment fluid. The friction reducing copolymer may be provided in a solid form, suspended in an oil-external copolymer emulsion, or as a component of an aqueous solution.

To facilitate a better understanding of the present invention, the following examples of certain aspects of some embodiments are given. In no way should the following examples be read to limit, or define, the scope of the invention.

EXAMPLE 1

The radius of gyration for several friction reducing copolymers was calculated to determine acrylic acid derivatives that may be suitable for use in the friction reducing copolymers of the present invention. Using Materials Studio, version 4.0, published by Accelrys, Inc., the amorphous cell module constructed a periodic boundary condition with a three dimensional box with 100 water molecules, model copolymers, and a salt. The model copolymers consisted of 10 monomers total, 7 acrylamide monomers and 3 acrylic acid derivative monomers. The acrylic acid derivative monomers utilized are represented by the following formula: $CH_2CHCO_2R$, wherein the designated R group is identified in Table 1 below. In those instances wherein R is H, the model copolymer consisted only of acrylamide and acrylic acid.

TABLE 1

| Acrylic Acid Derivative, R | % Salt Additive | Radius of Gyration |
|---|---|---|
| $(CH_2)_{11}CH_3$ | 2% $CaCl_2$ | 4.403121094 |
| H | 2% Tetramethyl Ammonium Chloride | 4.528692831 |
| H | 2% $CaCl_2$ | 4.537672844 |
| H | 2% Potassium Formate | 4.592102264 |
| $CH_2CH_2OH$ | 2% $CaCl_2$ | 4.742162218 |
| H | 2% $CaCl_2$ | 4.876152927 |
| H | 2% $CaCl_2$ | 4.9123214 |
| H | 2% $CaCl_2$ | 4.916635426 |
| $(CH_2CH_2O)_2CH_2CH_2OH$ | 2% $CaCl_2$ | 4.940284829 |
| H | 2% Potassium Acetate | 4.952512972 |
| H | NONE | 5.085112313 |
| H | 2% $CaCl_2$ | 5.183655561 |
| $(CH_2CH_2O)_3CH_2CH_2OH$ | 2% $CaCl_2$ | 5.25659844 |
| $CH_2CH_2OCH_2CH_2OH$ | 2% $CaCl_2$ | 5.354284857 |
| $CH_2CH_2OCH_2CH_2OCH_2CH_3$ | 2% $CaCl_2$ | 6.000544538 |

Therefore, as seen from the results above, it was determined that it is desirable to include an acrylic acid ester in the copolymers of the present invention because they generally have a larger radius of gyration in the presence of interfering salts. Among the esters tested, 2-(2-hydroxyethoxy)-ethyl acrylate was calculated to have the largest radius of gyration even in the presence of polyvalent metal ions such as calcium.

EXAMPLE 2

A friction reducing copolymer that comprised acrylamide and an acrylic acid ester was prepared by a solution polymerization technique in accordance with the following procedure. The acrylic acid ester used was 2-(2-hydroxyethoxy)-ethyl acrylate. First, both the acrylamide and the acrylic acid ester were purified. To purify the acrylamide, chloroform was heated to boiling and then added to 50 grams ("g") of acrylamide. A minimum amount of chloroform was then added to achieve solution, approximately 600 mL. Once solution was achieved, the mixture was then removed from the heat, sealed with parafilm, wrapped in foil and allowed to slowly cool to room temperature. After cooling, the solution was placed in a freezer. After approximately 1 hour, the acrylamide was filtered by a vacuum with a Buchner funnel in a fume hood. The acrylamide was protected from light and heat before being placed in the reaction vessel. To purify the 2-(2-hydroxy-ethoxy)-ethyl acrylate, it was passed through an Aldrich column purchased for the removal of 4-methoxyphenol (MEHQ).

After the acrylamide and 2-(2-hydroxy-ethoxy)-ethyl acrylate were purified, 1200 milliliters ("mL") of water were then purged. To purge the water, it was stirred mechanically at 300 rpm and a glass dispersion tube was submerged beneath the surface of the water while nitrogen was forced through for approximately 12 hours to remove dissolved oxygen. After the tube was raised to prevent foaming, the stirring was stopped and 36 g of sodium dodecyl sulfate was added to the water. Next, 45.3 g of the purified acrylamide and 17.3 g of the purified 2-(2-hydroxy-ethoxy)-ethyl acrylate were added to the solution. This solution was then stirred for 72 hours to equilibrate the micelles before commencement of the polymerization. Finally, 0.025 g of an initiator, azobisisobutyronitrile ("AIBN") was added and the solution was heated to 50° C. for 18 hours. At the end of 18 hours, the polymer was decanted for friction reduction testing.

EXAMPLE 3

To evaluate the relative effectiveness of conventional friction reducing copolymers and friction reducing copolymers of the present invention in the presence of interfering salts, friction reduction tests were performed using aqueous treatment fluids comprising either fresh water or a 0.5% CaCl$_2$ brine solution. For this series of tests, the composition of the aqueous treatment fluids comprising a friction reducing copolymer of the present invention are given in Table 2 below.

TABLE 2

| Component | % by weight |
|---|---|
| Copolymer comprising acrylamide and acrylic acid ester | 4.8 |
| sodium dodecyl sulfate | 2.8 |
| Water/Brine Solution | 92.4 |
| Total | 100.0 |

These friction reduction tests were performed using a Friction Reduction Meter ("FR Meter") in accordance with the procedure listed below. The FR Meter was a closed loop pipeline apparatus designed to measure the pressure drop across a 5-foot section of a 12-foot commercial steel pipe and a 5-foot section of a 12-foot smooth Hastaloy C pipe. The commercial steel pipe had an inner diameter of 0.619 inches with a wall roughness of 0.00011 feet. The Hastaloy C pipe had an inner diameter of 0.534 inches. The FR Meter consisted of a storage/mixing tank connected to a fixed speed progressive cavity pump which pumped the test fluid through a magnetic flow meter then through the test pipes and a return line to the storage/mixing tank.

For each test, either 10 liters of tap water (fresh water) or 10 liters of tap water with a 0.5% CaCl$_2$ (brine solution) were added to the storage/mixing tank. Next, the pump was run to circulate the water for an amount of time sufficient to fill all the pipes with water. Once the pipes were filled with water, the pump was stopped. The data acquisition system was started, and the pump was started after about an additional 10 to 15 seconds. The data acquisition system measured the flow rate, tank temperature, and pressure drop across the 5-foot section of each pipe. At about 1 minute into the test, approximately 1% of the friction reducing copolymer was added to the storage/mixing tank. The test was run for a total of about 20 minutes, with flow rate, tank temperature, and pressure drop across each 5-foot section of pipe recorded at one-second intervals. The pump rate was about 30 liters per minute, or 3 system volumes per minute. For the commercial steel pipe, the flow was fully turbulent at a Reynolds Number of about 50,000.

The first minute of data that was collected prior to the addition of the friction reducing copolymer was used to verify instrument readings and provide a baseline of data with a known fluid. The pressure drop across the 5-foot section of pipe for the water was calculated from the flow rate and pipe dimensions in accordance with the following formula:

$$\Delta P_{water} = \frac{\rho V^2 Lf}{2g_c D_h}$$

wherein $\Delta P_{water}$ is the calculated pressure drop for the water, $\rho$ is density, V is the velocity, L is length, $g_c$ is the gravitational constant, and $D_h$ is the pipe diameter. The variable f was calculated in accordance with the formula below for turbulent flow.

$$f = \left\{-2\log\left[\frac{\varepsilon/d}{3.7} - \frac{5.02}{N_{Re}}\log\left(\frac{\varepsilon/d}{3.7} + \frac{14.5}{N_{Re}}\right)\right]\right\}^{-2}$$

wherein $\varepsilon$ is pipe roughness, d is the pipe diameter, and $N_{Re}$ is the Reynold's Number (Shacham, M., *Isr. Chem. Eng.*, 8, 7E (1976)).

Following the addition of the friction reducing copolymer to the tank, the measured pressure drop was compared to the calculated pressure drop for the water to determine the % Friction Reduction ("% FR") using the following equation:

$$\% \, FR = 1 - \frac{\Delta P_{measured}}{\Delta P_{water}}$$

wherein $\Delta P_{water}$ is the calculated pressure drop for the water and $\Delta P_{measured}$ is the measured pressure drop after introduction of the friction reducing copolymer.

To determine the relative effectiveness of the friction reducing copolymers of the present invention and conventional friction reducing copolymers in brine solution, the following equation was used:

$$\% \, \text{Effective} = \frac{\% \, FR_{brine}}{\% \, FR_{fresh \, water}}$$

The results of this series of test are shown in Table 3 below.

TABLE 3

| | Friction Reducing Copolymer (Type) | |
|---|---|---|
| Measured Parameter | Acrylamide/Acrylic Acid | Acrylamide/Acrylic acid ester |
| % Effective at 4 min. in brine solution | 6.88% | 93.06% |
| % Effective at 9 min. in brine solution | 13.36% | 90.15% |

TABLE 3-continued

| | Friction Reducing Copolymer (Type) | |
|---|---|---|
| Measured Parameter | Acrylamide/Acrylic Acid | Acrylamide/Acrylic acid ester |
| % Effective at 14 min. in brine solution | 12.64% | 90.23% |
| % Effective at 19 min. in brine solution | 13.09% | 92.72% |
| Average % Effective in brine solution | 11.49% | 91.54% |

The percent effectiveness at various times may be used to compare the relative performance of the friction reducing copolymers of the present invention and conventional friction reducing copolymers in the presence of interfering salts. A higher sum should represent better friction reduction. The start time for these measurements was when the friction reducing copolymer was added to the storage/mixing tank.

These examples thus show that a friction reducing copolymer of the present invention may provide friction reduction in the presence of polyvalent cations.

EXAMPLE 4

Emulsion tests were performed using friction reducing copolymers of the present invention to determine if the friction reducing copolymers of the present invention exhibited reduced flocculation tendencies in comparison to conventional friction reducers. A copolymer of acrylamide and acrylic acid was mixed with water, $CaCl_2$, and kerosene in the presence of 1% by weight polymer. This conventional friction reducer formed an intractable emulsion that precipitated from solution. Next, a copolymer of the present invention comprising acrylamide and an acrylic acid ester was mixed with water, $CaCl_2$, and kerosene in the presence of 1% by weight polymer. The emulsion cleanly separated in less than 30 seconds. This example demonstrates that the friction reducing copolymers of the present invention have reduced flocculation tendencies.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method of treating a portion of a subterranean formation, comprising:
   providing an aqueous treatment fluid comprising an aqueous fluid, and a friction reducing copolymer that comprises acrylamide and 2-(2-hydroxy-ethoxy)-ethyl acrylate; and
   introducing the aqueous treatment fluid into the portion of the subterranean formation.

2. The method of claim 1 wherein the friction reducing copolymer comprises acrylamide in an amount in the range of from about 60% to about 95% by weight and 2-(2-hydroxy-ethoxy)-ethyl acrylate in an amount in the range of from about 5% to about 40% by weight.

3. The method of claim 1 wherein the aqueous treatment fluid is introduced into the portion of the subterranean formation at a rate sufficient to create or enhance one or more fractures in the portion of the subterranean formation.

4. The method of claim 1 wherein the friction reducing copolymer is present in the aqueous treatment fluid in an amount sufficient to reduce friction without forming a gel.

5. The method of claim 1 wherein the aqueous treatment fluid is introduced into the formation at rate in the range of from about 30 barrels per minute to about 250 barrels per minute.

6. The method of claim 1 further comprising the step of preparing the aqueous treatment fluid, wherein the step of preparing the aqueous treatment fluid comprises:
   providing the friction reducing copolymer; and combining the friction reducing copolymer and the aqueous fluid to form the aqueous treatment fluid.

7. The method of claim 6 wherein the step of providing the friction reducing copolymer comprises providing an oil-external copolymer emulsion that comprises water, a water-immiscible liquid, an emulsifier, and the friction reducing copolymer.

8. The method of 7 wherein the oil-external copolymer emulsion inverts subsequent to combination with the water, releasing the friction reducing copolymer into the water with which the oil-external copolymer emulsion was combined.

9. The method of claim 1 wherein the friction reducing copolymer is present in an amount in the range of from about 0.01% to about 1% by weight of the aqueous treatment fluid.

10. A method of treating a portion of a subterranean formation, comprising:
    providing an aqueous treatment fluid comprising an aqueous fluid, and a friction reducing copolymer that comprises acrylamide in an amount in the range of from about 60% to about 95% by weight and 2-(2-hydroxy-ethoxy)-ethyl acrylate in an amount in the range of from about 5% to about 40% by weight; and
    introducing the aqueous treatment fluid into the portion of the subterranean formation.

11. The method of claim 10 wherein the aqueous treatment fluid is introduced into the portion of the subterranean formation at a rate sufficient to create or enhance one or more fractures in the portion of the subterranean formation.

12. The method of claim 10 wherein the friction reducing copolymer is present in the aqueous treatment fluid in an amount sufficient to reduce friction without forming a gel.

13. The method of claim 10 wherein the aqueous treatment fluid is introduced into the formation at rate in the range of from about 30 barrels per minute to about 250 barrels per minute.

14. The method of claim 10 wherein the friction reducing copolymer is present in an amount in the range of from about 0.01% to about 1% by weight of the aqueous treatment fluid.

15. A method of fracturing a subterranean formation comprising:

providing an aqueous treatment fluid comprising water, and a friction reducing copolymer that comprises acrylamide and 2-(2-hydroxy-ethoxy)-ethyl acrylate; and introducing the aqueous treatment fluid into the subterranean formation at or above a pressure sufficient to create one or more fractures in the subterranean formation.

16. The method of claim 15 wherein the friction reducing copolymer comprises acrylamide in an amount in the range of from about 60% to about 95% by weight and 2-(2-hydroxy-ethoxy)-ethyl acrylate in an amount in the range of from about 5% to about 40% by weight.

17. The method of claim 15 wherein the friction reducing copolymer is present in the aqueous treatment fluid in an amount sufficient to reduce friction without forming a gel.

18. The method of claim 15 wherein the aqueous treatment fluid is introduced into the formation at rate in the range of from about 30 barrels per minute to about 250 barrels per minute.

19. The method of claim 15 further comprising the step of preparing the aqueous treatment fluid, wherein the step of preparing the aqueous treatment fluid comprises:

providing the friction reducing copolymer; and combining the friction reducing copolymer and the aqueous fluid to form the aqueous treatment fluid.

20. The method of claim 15 wherein the friction reducing copolymer is present in an amount in the range of from about 0.01% to about 1% by weight of the aqueous treatment fluid.

\* \* \* \* \*

UNITED STATES PATENT AND TRADEMARK OFFICE
CERTIFICATE OF CORRECTION

PATENT NO. : 7,311,146 B2
APPLICATION NO. : 11/504939
DATED : December 25, 2007
INVENTOR(S) : Robert E. Hanes, Jr. et al.

It is certified that error appears in the above-identified patent and that said Letters Patent is hereby corrected as shown below:

Column 8, lines 46-49
After, "Among the esters tested, 2-(2-hydroxy-ethoxy)-ethyl acrylate was calculated to have the", insert --second--.

Signed and Sealed this

Twenty-ninth Day of July, 2008

JON W. DUDAS
*Director of the United States Patent and Trademark Office*